United States Patent [19]

Langner et al.

[11] Patent Number: 4,944,935
[45] Date of Patent: Jul. 31, 1990

[54] PROCESS FOR PRODUCING COPPER HYDROXIDE

[75] Inventors: Bernd Langner, Winsen/Luhe; Rene-Holger Wilde, Badendorf, both of Fed. Rep. of Germany

[73] Assignee: Norddeutsche Affinerie Aktiengesellschaft, Hamburg, Fed. Rep. of Germany

[21] Appl. No.: 196,839

[22] Filed: May 18, 1988

Related U.S. Application Data

[63] Continuation-in-part of Ser. No. 21,486, Mar. 4, 1987, abandoned.

[30] Foreign Application Priority Data

Mar. 4, 1986 [DE] Fed. Rep. of Germany ....... 3606920

[51] Int. Cl.$^5$ ............................................... C01G 3/02
[52] U.S. Cl. ................................................... 423/604
[58] Field of Search ............................ 423/604, 32, 33

[56] References Cited

U.S. PATENT DOCUMENTS

| | | | |
|---|---|---|---|
| 2,474,497 | 6/1949 | Rowe | 423/604 |
| 2,536,096 | 1/1951 | Rowe | 423/604 |
| 2,647,829 | 8/1953 | McGauley et al. | 423/33 |
| 2,670,273 | 2/1954 | Munn | 423/604 |
| 3,971,652 | 7/1976 | Bryson | 423/33 |

FOREIGN PATENT DOCUMENTS 1318095  3/1962  France ................................ 423/604

OTHER PUBLICATIONS

Masterton, William L., and Slowinski, Emil J., *Chemical Principles*, 4th Ed. Saunders Golden Sunburst Series, Philadelphia, Penn., 1977, p. 453.

*Primary Examiner*—Robert L. Stoll
*Attorney, Agent, or Firm*—Herbert Dubno; Jonathan Myers

[57] ABSTRACT

A process of producing blue copper hydroxide, wherein copper metal is treated with an ammonium ion-containing aqueous solution with stirring and with a simultaneous introduction of an oxygen-containing gas and the reaction product is separated from the copper metal. A particulate, floatable copper (II) hydroxide is produced in that a material which contains copper metal is treated at a temperature of 0° to 40° with a solution which contains 0.1 to 10 g/l ammonium salt (calculated as $NH_4$), 0 to 10 g/l ammonium hydroxide (calculated $NH_3$) and, if desired, 0 to 5 g/l copper (II) salt and the resulting copper (II) hydroxide is separated.

11 Claims, No Drawings

PROCESS FOR PRODUCING COPPER HYDROXIDE

This is a continuation-in-part of co-pending application Ser. No. 021,486 filed on Mar. 4, 1987, now abandoned.

FIELD OF THE INVENTION

Our present invention relates to a process for producing particulate copper hydroxide from a material which contains copper metal.

BACKGROUND OF THE INVENTION

Copper hydroxide is a technically important starting material which is mainly used as an active constituent of fungicidal and insecticidal compositions. Other fields of application are baths for the electrodeposition of copper and as a starting material for making catalysts. Copper hydroxide serves also as a reactive starting material in the production of other copper salts, such as copper arsenate for use in wood preservatives.

It is known to produce copper hydroxide in a two-stage process from a previously produced copper salt, such as copper sulfate, copper carbonate or copper oxychloride, in a process in which alkalies are used to effect a precipitation of copper hydroxide usually at a temperature below 20° C. (U.S. Pat. Nos. 3,635,668 and 4,490,337, European Patent No. 80,226).

These processes have the disadvantage that copper salt is always required as an intermediate product and that the use of alkalies as a precipitant will result in the formation of large quantities of waste water, which must be treated before it can be disposed of.

U.S. Pat. No. 2,536,096 discloses a single-stage process in which copper hydroxide is produced directly from scrap copper in a solution of ammonia in concentrations in excess of 10 g/l of soluble ammonium and preferably in excess of 30 g/l.

The resulting hydroxide first deposits on the copper surface and must continuously be removed by friction.

This process has other disadvantages as well. Only high concentrations of ammonia will ensure sufficiently high reaction rates. For this reason, a washer or a totally enclosed reaction vessel will be required. Besides, the product still contains substantial quantities of ammonia, which must be washed out by means of large quantities of water. Moreover, the use of ammonia results in pollution at the work place and in the environment.

OBJECT OF THE INVENTION

It is an object of the invention to avoid the disadvantages of these processes and to provide an economical process for producing particulate copper hydroxide having a high floatability in such a manner that water-treatment problems will be avoided.

SUMMARY OF THE INVENTION

This is accomplished by a single-reaction-stage production process at ambient pressure.

In this process, blue copper hydroxide is produced by treating copper metal with an ammonium-ion-containing aqueous solution with stirring and with a simultaneous introduction of an oxygen-containing gas.

According to the invention, a particulate, floatable copper (II) hydroxide is produced by treating a material which contains copper metal at a temperature of 0° to 40° C. with an aqueous solution which contains 0.1 to 10 g/l ammonium salt (calculated as $NH_4$), 0 to 1 g/l ammonium hydroxide (calculated as $NH_3$) and, if desired, 0 to 5 g/l copper (II) salt, and the resulting copper (II) hydroxide is separated.

It has been found that the presence of ammonium salts alone in the treating liquor is sufficient to effect a reaction of the copper metal at temperatures below 40° C. and preferably from 0° to 30° and a precipitation of particulate blue copper hydroxide. The resulting material has an excellent floatability in suspension.

The copper-containing material used as a starting material may consist of scrap copper, e.g. from shredder plants, or of pieces of cut wire or of granules. A suitable scrap material consists, e.g. of pieces of copper wire in a length from about 1 to 5 mm and a thickness from about 0.1 to 1 mm.

The processing liquor which contains the copper-containing material, is suitably vigorously stirred with such violence that substantially the entire quantity of starting material is whirled up.

The ammonium salt is contained in the aqueous liquor in a quantity of 0.1 to 10 g/l, preferably from 0.5 to 6 g/l, calculated in each case as $NH_4$.

Ammonium chloride, ammonium sulfate, ammonium phosphate, ammonium nitrate or ammonium acetate, individually or in combination, are suitably used as the ammonium salt. It is also possible to use ammonium salts of other inorganic or organic acids, individually or in combination. In some cases, the reaction rate can desirably be increased by an addition of small quantities of ammonium hydroxide to the aqueous liquor which contains ammonium salt; said addition of ammonium hydroxide may amount to as much as 1 g/l, preferably 0.8 g/l.

In another embodiment of the invention, the processing liquor may contain a small quantity of a copper (II) salt, such as copper sulfate or copper nitrate, in a small quantity not in excess of 5 g/l calculated as Cu(II). The presence of this copper (II) salt results in a uniform initiation of the reaction.

The oxygen or the oxygen-containing gas is suitably distributed in the liquor to a state of fine division, e.g. in that the gas is introduced by means of frit or perforate plates or is distributed by a stirring system after introduction through a pipe. The oxygen may be used as a pure gas or may be diluted with inert gases. Air or oxygen-enriched air may suitably be used as an oxygen source. The pressure in the reaction vessel is not critical. The starting material which contains metallic copper is suitably treated under atmospheric pressure, but other pressures may be used as well.

The metallic copper may be treated with the liquor intermittently or in a continuous or semi-continuous operation.

In dependence on the particle size of the starting material, the quantities and kind of the active constituents and the processing temperature, the treatment with the liquor may take from about 6 to about 20 hours.

When the treatment with the liquor has been terminated, the suspension containing the particulate blue copper hydroxide is separated from the unreacted copper metal and the copper hydroxide is filtered from the suspension and is dried. The material must not be dried at a temperature in excess of 110° C.

It is usually not necessary to wash the copper hydroxide, because the processing liquor contains in any case, only small quantities of active constituents. Because of its fineness, the copper hydroxide has a high floatability in a suspension. That property is of great importance particularly when the copper hydroxide produced in accordance with the invention is used as an active constituent in fungicidal or insecticidal compositions. The copper hydroxide produced in accordance with the invention has a particle size below 30 um.

The advantages afforded by the process in accordance with the invention reside in that a particulate, floatable copper hydroxide can be produced in an economical single-stage process, in which no waste water is formed which must be treated.

The process of the invention can be described as a pressureless-stirring method since the reaction is carried out exclusively at atmospheric or ambient pressure and does not use a pressure vessel.

It is a unique advantage of the process of the invention that it can be carried out in a vessel which is not closed, but rather is an open agitator vessel in continuous communication with the ambient atmosphere.

Because of the fact that it does not require pressurization of the contents of the reactor, we are able to avoid the need for complex apparatus such as that described in U.S. Pat. No. 2,670,273(Munn). The apparatus proposed by Munn, for example, is difficult to empty and fill, by comparison with an apparatus which can operate at ambient pressure.

Finally, we have found stirring, using a radial-blade stirrer with a vertical axis, to be important to the formation of a good suspension of the metallic copper in the reaction medium and to the fine dispersion of oxygen therein. It appears that similar results are not obtainable by an agitation which involves tumbling. It appears that in tumbling only about 30% to 50% of the reactor volume is useful, by contract to close to 100% of the reactor availability in the pressureless-stirring method of the invention. The open reactor design of the reaction vessel of the invention allows simple cooling coils to be used to dissipate the heat developed in the exothermic reaction process. The temperature can easily be held to no more than 30° C. in this manner.

SPECIFIC EXAMPLES

The invention will be explained in more detail, in accordance with the following Specific Examples.

EXAMPLE 1

1.5 liters of an aqueous processing liquor were charged into an open reactor, which was provided with a high-speed stirrer and was provided at the bottom of the vessel with a porous body for introducing gas.

The aqueous processing liquor contained 1 g/l $NH_3$, 1 g/l $(NH_4)_2SO_4$ and 4 g/l $CuSO_4 \cdot 5H_2O$. Then 260 grams copper wire pieces having a length of 3 mm and a diameter of 0.5 mm were added to the liquor and were treated at room temperature with stirring and in the presence of oxygen, which was blown into the liquor.

Owing to the reaction heat, the temperature rose to about 30° C. during the treatment with the liquor. After 7 hours, the copper content of the suspension of copper hydroxide had increased to 66 g/l and the suspension contained less than 300 mg/l dissolved copper. After the reaction, the suspension was delivered to a sieve by which the remaining copper metal was separated from the copper hydroxide. The copper hydroxide which had been filtered off, had a floatability of 91% after 30 minutes and, after having been dried at 60° C., contained 66.7% Cu. Substantially the same results will be obtained if the reaction is accompanied by a cooling to a temperature of about 20° C.

EXAMPLE 2

Under the conditions used in Example 1, an aqueous starting liquor was used which contained 1 g/l $NH_3$, 1 g/l $NH_4NO_3$ and 3.8 g/l $Cu(NO_3)_2$. After 6 hours, the copper content of the suspension of the copper hydroxide had increased to 40 g/l. The blue product had a silky gloss and a floatability of 89% and, after drying, contained 66% Cu.

EXAMPLE 3

The processing was the same as in Example 1, but the starting liquor contained 1 g/l $NH_3$, 1 g/l $NH_4Cl$ and 4 g/l $CuSO_4 \cdot 5H_2O$. After six hours, the suspension of blue copper hydroxide contained 58 g/l $Cu(OH)_2$ and was filtered. The product had a floatability of 96% and contained 67.1% copper.

EXAMPLE 4

The processing was the same as in Example 1, but the starting liquor contained 1 g/l $NH_4Cl$ and 1 g/l $(NH_4)_2SO_4$. The reaction mixture was cooled to maintain it at a temperature of 18° C. After six hours, the blue suspension contained 105 g/l $Cu(OH)_2$. After drying, the product contained 65% copper and had a floatability of 78%.

EXAMPLE 5

The processing was the same as in Example 1, but the starting liquor contained 5 g/l $NH_4Cl$ and 1 g/l $(NH_4)_2SO_4$. The reaction mixture was cooled and was thus maintained at a temperature of 18° C. 132 g/l Cu had been reacted after 20 hours. The copper hydroxide was filtered off and, after drying, contained 64% copper and had a floatability of 93%.

EXAMPLE 6

The processing was as in Example 1, but the starting liquor contained 5 g/l $NH_4Cl$, 1 g/l $(NH_4)_2SO_4$ and 1 g/l ammonia. The reaction mixture was cooled to maintain it at a temperature of 18° C. 131 g/l copper had been reacted after six hours. The copper hydroxide was filtered off and, after drying, contained 64% copper.

We claim:

1. A process for producing blue copper hydroxide which comprises the steps of:
   (a) treating a material containing copper metal at a temperature of 0° C. to 40° C. with an aqueous solution of:
      0.1 to 10 g/l of $NH_4^+$ in an ammonium salt selected from the group consisting of:
         ammonium chloride,
         ammonium sulfate,
         ammonium phosphate,
         ammonium nitrate, and
         ammonium acetate, and
      0 to 5 g/l of a copper(II) salt, and
      0 to 1 g/l of ammonium hydroxide calculated as $NH_3$, with stirring and with simultaneous introduction into said solution of an oxygen-containing gas, at atmospheric pressure in continuous communication with the ambient atmosphere, to produce directly a suspension of solid suspended particles of copper(II) hydroxide at least in part from copper of said material; and (b) thereafter separating the suspended particles of copper (II) hydroxide produced in step (a) from the solution.

2. The process defined in claim 1 wherein said temperature is 0° C. to 30° C.

3. The process defined in claim 2 wherein said ammonium salt is present in said solution in an amount of 5 to 6 g/l calculated as $NH_4$.

4. The process defined in claim 3 wherein said material is at least one material selected from the group which consists of shredder scrap copper, copper granules and pieces of copper wire.

5. The process defined in claim 4 wherein said material includes pieces of copper wire of a length of about 1 to 5 mm and a thickness of about 0.1 to 1 mm.

6. The process defined in claim 1 wherein said solution contains at least 0.1 g/l of said copper (II) salt calculated as Cu (II).

7. The process defined in claim 6 wherein said copper (II) salt is at least on salt selected from the group which consists of copper (II) sulfate and copper (II) nitrate.

8. The process defined in claim 7 wherein the gas is selected from the group which consists of oxygen, air and oxygen-enriched air.

9. The process defined in claim 8 wherein step (a) is carried out for a period of about 6 to 20 hours.

10. The process defined in claim 9 wherein the separation of step (b) is carried out by filtration.

11. The process defined in claim 10, further comprising the step of:

(c) drying the copper (II) hydroxide separated from said solution in step (b).

* * * * *